March 28, 1933. W. BARNES, JR 1,903,085
HOSE RACK
Filed July 28, 1932
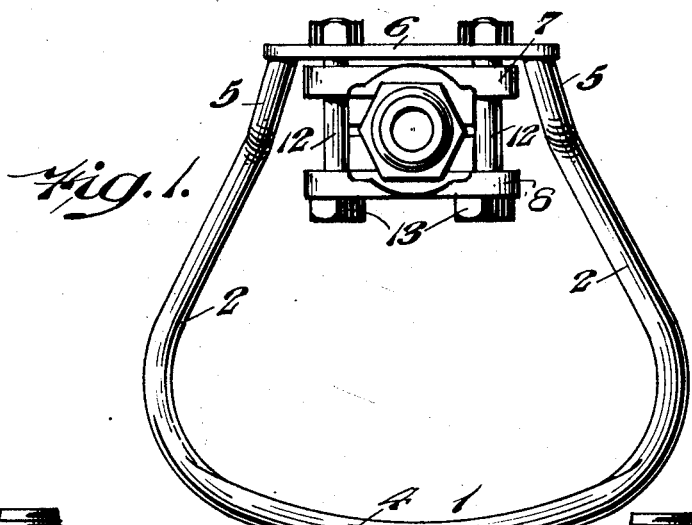
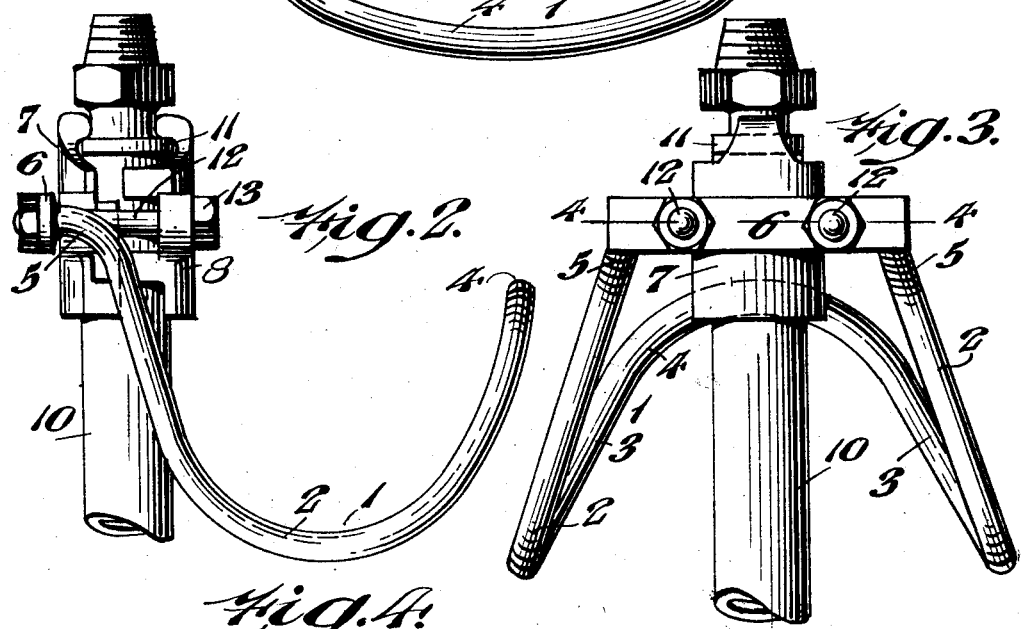
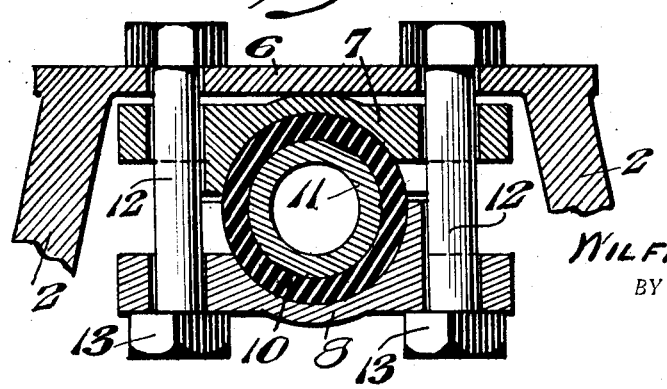
INVENTOR.
WILFRED BARNES, JR.
BY Louis Necho
ATTORNEY.

Patented Mar. 28, 1933

1,903,085

UNITED STATES PATENT OFFICE

WILFRED BARNES, JR., OF GLENOLDEN, PENNSYLVANIA

HOSE RACK

Application filed July 28, 1932. Serial No. 625,443.

My invention relates to a new and useful portable hose rack particularly adapted for supporting a hose in the coiled condition when such hose is not in use, so as to maintain the hose ready for use at any time and yet to keep the hose in an out of the way position.

In industrial establishments, such as creameries, factories, or other large halls or enclosures, it is customary to provide water outlets at convenient locations in the walls of such buildings, to which outlets a hose is adapted to be connected to supply water to any desired point such as for the purpose of washing a particular machine, or the floor of the building or similar purposes. The practice heretofore prevailing is for the workman to connect a hose to any particular desired outlet, and when the work is done, such hose had to be removed and stored elsewhere, or it had to be left on the floor or otherwise stored. Since it is often necessary to make frequent use of the hose, the practice of carrying the hose back and forth from a more or less remote storage room is inconvenient and wasteful, and to leave the hose lying on the floor or otherwise stored in the same room where it is to be used is not any more desirable. It is further to be remembered that the walls of such establishments are usually made of brick, concrete, or other structure, wherein it is impossible to drive spikes or nails for the purpose of securing any desired hose supporting means. Furthermore no one has as yet thought of providing, in the original plans of such buildings, for means on which a coiled hose could be supported when not in use.

In order to remedy these disadvantages, I have provided a portable hose rack which is permanently carried by a fitting which is ordinarily provided at the inlet end of the hose for connection to whatever water outlet is provided for this purpose, so that when the hose is connected to any given water outlet, the hose when not in use can be suitably coiled upon a rack which is carried by the fitting which connects the hose to that particular outlet, where the hose can remain indefinitely until it is used again either in connection with the same or in connection with another outlet.

To the above end, my invention consists of a concaved, or substantially U-shaped bracket, which is adapted to be secured to and carried by a clamp which in turn is adapted to secure the inlet end of the hose, to any desired fitting, by connection with any desired outlet.

My invention further consists of various other novel features of construction and advantage, all as hereinafter described and claimed in connection with the accompanying drawing in which:

Fig. 1 represents a plan view of a portable hose rack embodying my invention.

Fig. 2 represents side elevation of Fig. 1.

Fig. 3 represents the rear elevation of Fig. 2.

Fig. 4 represents a section on line 4—4 of Fig. 3.

Referring to the drawing in which like reference characters indicate like parts, my novel portable hose rack comprises the substantially U-shaped rod 1 which is bent or concaved as at 2 to form two U-shaped arms 3 which are joined at 4. The two U-shaped arms 2 afford a concaved recess or seat to receive a coiled length of hose in the usual manner. The rear ends 5 of the arms 2 are suitably secured to transverse bar 6. 7 and 8 designate complementary parts of a clamp which is adapted to clamp the rubber hose 10 around the nozzle, fitting, adapter, or other connection 11 in a water tight manner, the clamps 7 and 8 being secured together and to the transverse bar 6 by the bolts 12 which are tightened by means of the nuts 13. The connection, fitting, or adapter 11, is suitably secured in any desired manner to a water outlet in the wall of the establishment in which the hose is to be used, it being deemed unnecessary to show such water outlet or to illustrate the manner of coupling the connection 11 thereto. The hose 10 is thus suspended from the connection 11 which in turn is carried by the water outlet (not shown) and may be used at any desired point. When the hose 10 is not in use, it is coiled on the U-shaped arms 2, where it can remain until further use. If it is desired to use the hose in connection with another water outlet, it is merely necessary to disconnect the coupling 11 from the particular outlet and apply it to the next outlet to be used without the necessity of uncoiling the hose from the U-shaped arms 2.

It will thus be seen that I have provided convenient means for supporting a hose in an instantly available manner and yet in an out of the way position, and that my construction is available for instant application to the water outlets of any building without the necessity of any alterations to the fixtures or fittings of said building.

Having thus described my invention, what I claim as new and desire to secure by Letters Patent is:

In a device of the character stated, a hose supporting member formed of a continuous element deflected to form two parallel U-shaped members integral at their front ends and having their rear ends permanently secured to a transverse bar, a coupling adapted to engage a water outlet, said U-shaped members adapted to receive a coiled hose having one end thereof engaging said coupling, bolts carried by said transverse bar, and a sectional clamp carried by and adapted to be tightened by said bolts around the end of said hose engaging said coupling member.

In testimony whereof, I affix my signature.

WILFRED BARNES, Jr.